(12) United States Patent
Vincent

(10) Patent No.: US 7,886,543 B2
(45) Date of Patent: Feb. 15, 2011

(54) CENTRAL BODY FOR A TURBOJET EXHAUST CHANNEL, TURBOJET

(75) Inventor: Thomas Alain Christian Vincent, Palaiseau (FR)

(73) Assignee: SNECMA, Paris (FR)

( * ) Notice: Subject to any disclaimer, the term of this patent is extended or adjusted under 35 U.S.C. 154(b) by 959 days.

(21) Appl. No.: 11/742,829

(22) Filed: May 1, 2007

(65) Prior Publication Data
US 2007/0272477 A1 Nov. 29, 2007

(30) Foreign Application Priority Data
May 23, 2006 (FR) .................................. 06 04615

(51) Int. Cl.
*F02K 1/00* (2006.01)
(52) U.S. Cl. ......................................... 60/770; 181/213
(58) Field of Classification Search .................. 60/770, 60/725; 181/213, 222
See application file for complete search history.

(56) References Cited

U.S. PATENT DOCUMENTS

| | | | |
|---|---|---|---|
| 2,988,302 A * | 6/1961 | Smith ............................ 244/15 |
| 3,542,152 A * | 11/1970 | Oxx, Jr. et al. ............... 181/214 |
| 4,064,961 A | 12/1977 | Tseo |
| 4,122,672 A * | 10/1978 | Lowrie ....................... 60/226.1 |
| 4,137,992 A | 2/1979 | Herman |
| 4,240,519 A * | 12/1980 | Wynosky .................... 181/213 |
| 4,947,958 A * | 8/1990 | Snyder ........................ 181/296 |
| 5,184,455 A | 2/1993 | Ewing et al. |
| 5,592,813 A * | 1/1997 | Webb ......................... 60/226.2 |
| 5,655,361 A * | 8/1997 | Kishi ............................. 60/266 |
| 6,351,947 B1 * | 3/2002 | Keller et al. ................... 60/725 |
| 6,530,221 B1 * | 3/2003 | Sattinger et al. .............. 60/725 |
| 6,584,766 B1 * | 7/2003 | Czachor ........................ 60/266 |
| 6,845,607 B2 * | 1/2005 | Lair ............................... 60/263 |
| 7,267,297 B2 * | 9/2007 | Campbell et al. ........... 244/1 N |
| 7,413,053 B2 * | 8/2008 | Wasif et al. ................. 181/293 |
| 7,549,506 B2 * | 6/2009 | Sattinger ..................... 181/213 |
| 2003/0141144 A1 | 7/2003 | Wilson |
| 2005/0103018 A1 | 5/2005 | Graf et al. |

FOREIGN PATENT DOCUMENTS

EP 1 391 597 A2 2/2004

OTHER PUBLICATIONS

U.S. Appl. No. 11/690,381, filed Mar. 23, 2007, Bouty, et al.

* cited by examiner

*Primary Examiner*—William H Rodríguez
(74) *Attorney, Agent, or Firm*—Oblon, Spivak, McClelland, Maier & Neustadt, L.L.P.

(57) ABSTRACT

A device for attenuating acoustic noise from an exhaust nozzle of a turbojet is disclosed. The turbojet exhaust nozzle includes a central body spaced apart from an external casing, defining a gas exhaust channel therebetween. The central body includes a flexible sleeve within an external wall, defining at least one resonator cavity therebetween. The at least one resonator cavity is in fluid communication with the gas exhaust channel via a plurality of orifices through at least one upstream portion of the external wall. The at least one resonator cavity and plurality of orifices compose at least one Helmholtz resonator.

21 Claims, 1 Drawing Sheet

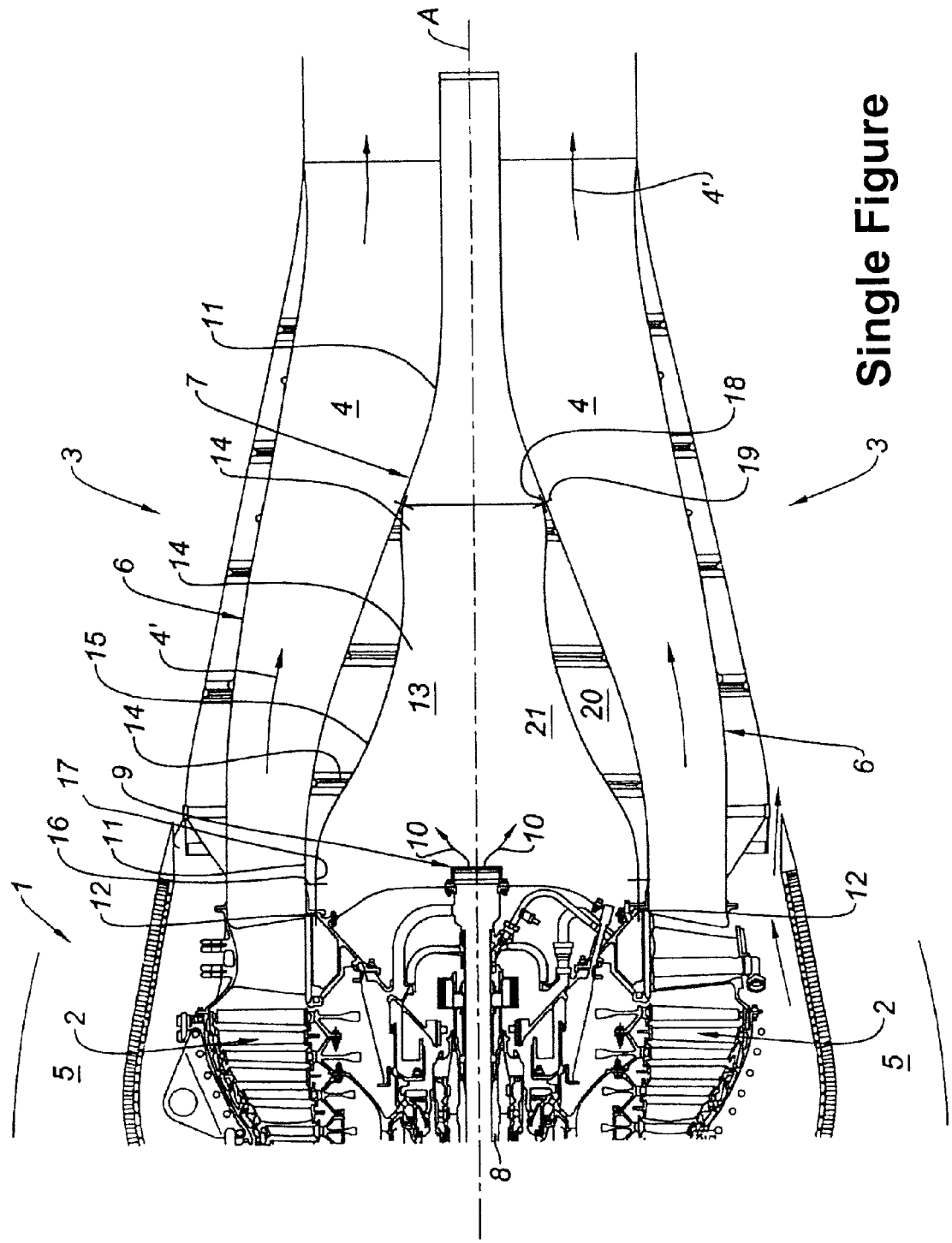

CENTRAL BODY FOR A TURBOJET EXHAUST CHANNEL, TURBOJET

BACKGROUND OF THE INVENTION

A turbojet comprises, from upstream to downstream in the direction of the gas flow, a fan, one or more compressor stages, a combustion chamber, one or more turbine stages and a gas exhaust nozzle. The gases of the turbojet main flow, that is to say the flow of gases coming out of the turbine stages and originating from the combustion chamber, are exhausted via the gas exhaust channel terminating in a nozzle. The gases of the bypass flow are ejected either separately from the main flow or mixed with the main flow.

The exhaust channel usually comprises an external casing, that delimits the external envelope of the gas stream of the exhaust flow, and an internal casing, that delimits the internal envelope of the gas stream of the exhaust flow, to help with its discharge. The internal casing forms a central body of the exhaust channel and has the shape of a wall having a surface of revolution, that may be cylindrical, conical or more generally of aerodynamic shape suitable for the flow, with symmetry of revolution about the axis of the turbojet. Those skilled in the art also call this central body of the exhaust channel the "plug". In what follows, it will be called the central body.

It is noted that the wall of the central body of the exhaust channel may also not have symmetry of revolution, for reasons of reducing the noise of the gas jet or of reducing the infrared signature; the central body may, in this case, have a corrugated, rectangular or elliptical cross section for example. The present invention applies particularly well to a central body with a wall with symmetry of revolution—which is usually the case in civil applications—but equally applies to a central body that does not have symmetry of revolution.

In certain turbojets, the central body fulfills another function that is to guide the turbojet vapor relief flow. Specifically, on certain turbojets, at the downstream end of its central shaft, a vapor relief orifice is provided through which various fluids such as oil vapor, certain cooling gases, etc. escape into the atmosphere. It is usually called an oil separator. In this case, either a pipe for guiding the vapor relief flow extends within the central body up to its end, for channeled guidance of the vapor relief flow, or no pipe is provided, the central body providing, via its internal surface, the guidance of the vapor relief flow. Vapor relief is usually carried out by aspiration, the pressure within the nozzle or of the central body being less than the pressure in the engine flow.

A constant problem that engine manufacturers have is noise reduction, particularly having in mind the comfort of the passengers and the inhabitants of zones overflown by aircraft. It is therefore necessary to attenuate the noise, particularly the noise in the nozzle, that consists of the noise generated in the combustion chamber, or combustion noise, that has low frequencies, and the noise generated in the high- and low-pressure turbines, or turbine noise, that has higher frequencies. With the known passive acoustic coverings, that is to say the devices whose geometry is fixed, the low-frequency combustion noise cannot be attenuated with the external casing of the exhaust channel because the volume in this location is not sufficient. It is therefore the higher-frequency turbine noise that can be treated on this casing, for example with the aid of a thin layer of a honeycomb-shaped material. The problem then posed is the attenuation of the low-frequency combustion noise.

DESCRIPTION OF THE PRIOR ART

Document U.S. Pat. No. 5,592,813 discloses the use of a central body for attenuating the combustion noise comprising two concentric surfaces between which honeycomb materials are arranged over a great thickness. Also known, through document EP 1,391,597, is the use of a central body formed of two cones for noise attenuation, the external cone being perforated and cavities being arranged between the two cones under the perforations. These cavities form some kind of large-dimension honeycombs better filtering the low frequency noises. Each assembly of a cavity and a plurality of holes forms a Helmholtz resonator making it possible to attenuate the acoustic frequencies in a manner well known to those skilled in the art. The same applies to the honeycombs, of smaller scale but over a great thickness.

The two solutions presented produce good results in noise attenuation. They are however very costly in price and in weight to install. It is almost impossible—and therefore expensive—to bend metal sheets formed into honeycombs, while the installation of larger cavities is awkward and of significant weight.

Furthermore, the mechanical strength of the assembly may be compromised by problems of differential expansion between the various elements.

SUMMARY OF THE INVENTION

The object of the present invention is to propose a device for attenuating the low-frequency noise of the engine, that is less costly and lighter, and therefore easier to industrialize. The low frequencies typically mean frequencies generally lying between 500 and 1000 Hz.

Accordingly, the invention relates to a central body for a turbojet gas exhaust channel, comprising an external wall and at least one internal wall forming at least one cavity between them, the external wall comprising a plurality of orifices pierced over at least one upstream portion, so as to form at least one Helmholtz resonator with the cavity, wherein the internal wall comprises a flexible sleeve.

The use of a flexible sleeve makes it possible to minimize the weight and therefore obtain a central body providing low-cost acoustic attenuation. Industrialization is easy and the mechanical strength assured, because the flexible sleeve absorbs the expansion differentials between the external and internal walls.

Preferably, the internal wall consists of a flexible sleeve.

In an advantageous embodiment, the sleeve is formed of a textile of ceramic fibers, preferably silica-based or basalt-based, with a thread that may for example be silica-based or metal-based.

Again advantageously, the sleeve is impermeable to air.

According to a first embodiment, the sleeve is attached at each of its ends to form a single cavity forming with the orifices a single Helmholtz resonator.

According to a second embodiment, the central body comprises a plurality of sleeves forming a plurality of cavities forming a plurality of Helmholtz resonators.

According to a third embodiment, the central body comprises a single sleeve with at least three annular attachment zones, forming a plurality of cavities forming a plurality of Helmholtz resonators.

The invention also relates to a turbojet comprising a main flow exhaust channel with the central body described above.

BRIEF DESCRIPTION OF THE DRAWING

The invention will be better understood with the aid of the following detailed description of the preferred embodiment of the invention, with reference to the appended single FIGURE, that represents a view in schematic section of a turbojet with the central body of the invention.

DESCRIPTION OF THE PREFERRED EMBODIMENTS

The turbojet 1 is a double-flow turbojet, the two flows being separate. It comprises, from upstream to downstream in the direction of flow of the gases, a fan, a low-pressure compressor, a high-pressure compressor, a combustion chamber, a high-pressure turbine, a low-pressure turbine 2 and a gas exhaust channel 3. The air is aspirated into the turbojet by the fan and is divided, downstream of the fan then throughout the turbojet, into a main flow 4 and a bypass flow. The main flow 4 passes into the compressors, the combustion chamber and the turbines to escape via the exhaust channel and the central nozzle. The bypass flow 5, originating directly from the fan, escapes at the periphery of the central nozzle, upstream of the latter, guided from the fan by the nacelle of the turbojet. The bypass flow 5 provides an important portion of the engine thrust.

The exhaust channel 3 comprises an external casing 6, whose internal surface delimits the external envelope of the stream of the main flow in the exhaust channel 3, and an internal casing 7, or central body 7, whose external surface delimits the internal envelope of the stream of the main flow in the exhaust channel 3, in a manner known to those skilled in the art. The main flow 4 is therefore guided between the internal casing 7 and external casing 6, as is shown schematically by the arrows 4'.

The low-pressure rotor, comprising in particular the low-pressure turbine and compressor, comprises a shaft 8. In the turbojet described here, an oil separator 9 is arranged at the downstream end of the shaft 8 of the low-pressure rotor. As schematized by the arrows 10, the oil vapor, various cooling gases, etc., escape via the deaerator by aspiration as will be seen later; this is the vapor relief flow 10.

The central body 7 comprises an external wall 11, that is a metal wall, preferably of constant thickness. This external wall 11 in this example is a wall of revolution, that is to say that it has symmetry of revolution about the axis A of the turbojet. Its shape is similar to that of the central bodies of the prior art, namely, an aerodynamic shape guiding the main flow 4. In this instance, from upstream to downstream, the external wall 11 is successively of cylindrical shape, frusto-conical shape with a diameter reducing in the downstream direction, then cylindrical again, with a smaller diameter than the upstream portion. These shapes follow on in a continuous and curvilinear manner. The external wall 11 is attached, on the upstream side, to the fixed structure 12 of the turbojet 1, in the extension of a wall delimiting the internal envelope of the main stream 4 emerging from the low-pressure turbine 2. As an example, the thickness of this external wall 11 may be 1 mm.

The wall 11 defines a cavity 13, that will be called the overall cavity 13 because it corresponds to the overall volume delimited by the external wall 11 of the central body 7. This cavity 13 is hollow, that is to say that no layers of honeycomb materials or other plurality of resonance cavities are provided as in the prior art for the attenuation of the noise.

Preferably, stiffener means 14 are provided that participate in the mechanical strength of the central body 7. These stiffener means 14 here have the shape of circumferential ribs arranged on the internal surface of the external wall 11 of the central body 7. There are three of them in the figure.

The external wall 11 of the central body 7 is pierced with a plurality of orifices, over an upstream portion of its surface, in a manner that cannot be seen in the figure due to their small diameter. These orifices therefore open, on the one hand, into the main flow of the turbojet 1, and, on the other hand, into the cavity 13 of the central body 7. The geometry and the positioning of the orifices are determined by computations, according to various acoustic parameters. There is no general rule and those skilled in the art will adapt them to their requirements and objectives. In this instance, the orifices are pierced regularly over an upstream portion of the wall 11, that extends up to the second stiffener means 14. All these orifices here have an identical diameter, are distributed uniformly and are placed in staggered rows. Typically, for a central body 7 in which the diameter of the cylindrical upstream portion is of the order of 60 to 70 cm, the orifices have a diameter of 0.5 to 1.5 mm.

The central body 7 furthermore comprises an internal wall 15, which extends inside the external wall of revolution 11 delimiting the overall cavity 13. The internal wall 15 is in the form of a flexible sleeve or a "sock", open on both sides. In the preferred embodiment of the invention, the internal wall 15 is totally formed of such a flexible sleeve.

This flexible sleeve 15 is advantageously formed by a textile of ceramic fibers, preferably silica-based or basalt-based, with a thread that may for example be silica-based or metal-based. In this instance, the textile used is a cloth of ceramic fibers similar to those that are used as a backing seal for the doors of industrial ovens or as a protective fire-resistant sheath in the aviation industry. Such a cloth withstands high temperatures (it withstands temperatures greater than 1000° C.). As an example, it is possible to use the cloth marketed under the registered trademark Nextel-3M.

The sleeve 15 is attached, upstream and downstream, along annular zones at its ends. The sleeve 15 is attached, upstream, to the fixed structure 12 of the turbojet 1. The sleeve is attached very simply, by riveting 16 the textile along a metal strapping 17 fixedly attached to the external wall 11 of the central body 7. The same applies on the downstream side, where the sleeve 15 is attached to a strapping 18, fixedly attached to the external wall 11 of the central body 7 by rivets 19. All these well known elements are shown schematically.

The sleeve 15 therefore delimits an external cavity 20 that extends between the external wall 11 and the sleeve 15, and an internal cavity 21, corresponding to the rest of the overall cavity 13 delimited by the external wall 11 of the central body 7, that is to say corresponding to the internal volume of the sleeve 15.

The external cavity 20 forms a resonance cavity 20 whose function is to attenuate the low-frequency noises in the nozzle, particularly the combustion noise, in cooperation with the orifices pierced in the external wall 11 of the central body 7, orifices that open, on the one hand, into this resonance cavity 20, and, on the other hand, into the main gas flow. The orifices form with the resonance cavity 20 a Helmholtz resonator, here with a single resonance cavity 20, common to all the orifices.

The effectiveness of such a Helmholtz resonator, with a single resonance cavity 20 for a plurality of orifices, is less than that of a plurality of Helmholtz resonators comprising a separate cavity for each orifice. However, such a central body 7 according to the invention is simple to install, hence low cost, and is lightweight. It is therefore a compromise between, on the one hand, an acceptable effectiveness with respect to noise attenuation, and, on the other hand, reasonable cost and weight.

The presence of the flexible sleeve 15 forming the internal wall of the resonance cavity 20 makes it possible to adjust the volume of this resonance cavity 20 according to the frequencies that it is desired to attenuate.

Thus, the volume of the resonance cavity 20 is adjusted by the tightness that is imposed on the sleeve 15. The latter, when it is not very tight, will take a form with a more or less pronounced curved profile, between its annular attachment ends and therefore make a larger space with the external wall than if it has more tension (that is to say if the wall of the sleeve 15 is tighter between its attachment ends).

It is necessary to ensure that the sleeve 15, that is flexible, does not press against the external wall 11 in operation. To do this, the static pressure within the internal cavity 21, that will be noted as $P_{21}$, must be less than the static pressure in the external cavity 20, that will be noted as $P_{20}$.

If the central body 7 is extended downstream of the nozzle 3 and is open at its downstream end, the static pressure of the internal cavity 21 is equal to the atmospheric pressure, that will be noted as $P_{atm}$, that is to say $P_{21}=P_{atm}$. Furthermore, because of the orifices pierced in the external wall 11, the static pressure of the external cavity 20 is equal to the static pressure of the main gas flow 4 at this location, that will be noted as $P_{flux}$, that is to say $P_{20}=P_{flux}$. The condition specified in the previous paragraph for the sleeve 15 not to press against the external wall 11 is written as follows:

$P_{21}<P_{20}$, that is to say $P_{atm}<P_{flux}$, which is always true in the case of a central body 7 that is open downstream of the nozzle.

Furthermore, such a relation not only prevents the sleeve 15 from pressing against the external wall 11 but further makes it possible for it to retain its shape. It is therefore highly possible, as specified above, to provide a relatively slack sleeve 15, that is to say not very tight between its annular attachment ends. In this case, due to the pressure differential between the external cavity 20 and the internal cavity 21, the sleeve 15 is kept in a concave form.

Because of the use of a flexible sleeve 15 to form the internal wall of the central body 7, the thermal expansion differences are absorbed by this sleeve 15, in particular if the latter is intentionally mounted slack (not tight).

The invention has been shown with respect to a sleeve 15 forming a single annular external cavity 20, common to all the orifices pierced in the external wall 11, said single external cavity 20 forming with the orifices a single Helmholtz resonator.

According to another embodiment not shown, the central body 7 comprises a plurality of sleeves 15, attached downstream of one another to form a plurality of annular external resonance cavities forming a plurality of Helmholtz resonators. In other words, a first sleeve is attached between two attachment zones, the upstream attachment zone of a second sleeve is attached just downstream of the attachment zone downstream of the first sleeve, and so on. Each sleeve therefore forms a resonance cavity for the orifices pierced in the zone of the external wall 11 situated between the two annular attachment ends of the sleeve.

According to another embodiment not shown, a single sleeve is attached to the external wall 11 of the central body 7, and comprises at least three annular zones of attachment to this wall 11, forming a plurality of resonance cavities 20 forming a plurality of Helmholtz resonators. This produces a geometry similar to the previous embodiment, except that the plurality of resonance cavities is obtained with the aid of a single sleeve. This sleeve is therefore in a way attached in concertina fashion to the external wall.

Note that the invention applies particularly well to the case where the central body 7 is open at its downstream end. The invention also applies to a closed central body, but from a certain altitude, the static pressure of the main flow $P_{flux}$ is less than the static pressure of the internal cavity $P_{21}$, the latter remaining equal to the static pressure on the ground, that is to say 1 bar. This therefore needs to be taken into account, because the sleeve 15 then presses against the external wall 11.

All the foregoing relating to the pressures applies on condition that the sleeve 15 is impermeable to air.

Furthermore, according to a particular embodiment, the sleeve 15 performs, on its internal surface, a guidance function for the vapor relief flow 10 coming from the deaerator 9. Since the sleeve 15 is not pierced with orifices and is impermeable to air, it makes it possible to maintain a static pressure $P_{21}$ in the internal cavity 21 below the pressure in the enclosure of the turbojet 1, which allows the vapor relief flow to be aspirated into the internal cavity 21.

If the sleeve 15 forms a single external cavity 20, the longitudinal extent of the upstream portion of the external wall 11, that is pierced with orifices, is determined by computations, based on a law of static pressure within the resonance cavity 20. Specifically, the main gas flow 4 tends to recirculate in the resonance cavity 20, that is to say it enters through an upstream orifice and exits through a downstream orifice. The smaller the longitudinal extent of the portion of wall pierced with orifices, the less substantial is this phenomenon. The longitudinal abscissa, on the wall 11 of the central body 7, from which there are no more orifices, is thus determined according to the tolerance threshold that those skilled in the art set for this gas recirculation. Incidentally, if this tolerance threshold is not too demanding, this upstream portion could mean the whole portion of the external wall 11 that is in line with the internal wall 15, that is to say the portion that forms the external wall of the resonance cavity 20. In the instance presented, the limit was set at about the second rib forming a stiffener means 14. The computations may be carried out in two or three dimensions depending on the degree of accuracy required; they make it possible to compute the distribution (law) of static pressure at a wall according to the change in the section and the Mach number in the main gas flow 4.

The invention claimed is:

1. A central body disposed within an outer casing of a turbojet gas exhaust nozzle, defining a gas exhaust channel therebetween, comprising:
   an external wall including a plurality of orifices through at least one upstream portion of the external wall; and
   at least one internal wall forming at least one resonance cavity between the external wall and the at least one internal wall,
   wherein the at least one resonance cavity and the plurality of orifices form at least one Helmholtz resonator, and
   wherein the at least one internal wall comprises at least one textile sleeve configured such that a pressure difference across the at least one textile sleeve supports a sleeve curve profile.

2. The central body as claimed in claim 1, wherein the at least one internal wall consists of one textile sleeve.

3. The central body as claimed in claim 1, wherein the at least one textile sleeve is formed of a textile of ceramic fibers, a textile of metallic fibers, or combinations thereof.

4. The central body as claimed in claim 1, wherein the at least one textile sleeve is substantially impermeable to air.

5. The central body as claimed in claim 1,
wherein the at least one textile sleeve is attached to the external wall to form a single cavity, and
wherein the single cavity and the plurality of orifices compose a single Helmholtz resonator.

6. The central body as claimed in claim 1,
wherein the at least one textile sleeve comprises a plurality of textile sleeves forming a plurality of resonance cavities, and
wherein the plurality of resonance cavities and the plurality of orifices form a plurality of Helmholtz resonators.

7. The central body as claimed in claim 1,
wherein the at least one textile sleeve consists of a single textile sleeve with at least three annular attachment zones, forming a plurality of resonance cavities, and
wherein the plurality of resonance cavities and the plurality of orifices compose a plurality of Helmholtz resonators.

8. The central body as claimed in claim 1, wherein the at least one textile sleeve defines at least one internal cavity in fluid communication with a vapor relief stream, for a turbojet comprising a deaerator.

9. The central body as claimed in claim 1, wherein the at least one textile sleeve is formed of a textile of silica-based fibers.

10. The central body as claimed in claim 1, wherein the at least one textile sleeve is formed of a textile of basalt-based fibers.

11. The central body as claimed in claim 1, wherein the at least one textile sleeve is formed of a textile of metal-based fibers.

12. A turbojet comprising;
an exhaust channel external casing; and
an exhaust channel inner casing spaced apart from the exhaust channel external casing, defining a main flow exhaust channel therebetween, the exhaust channel inner casing comprising:
  an external wall including a plurality of orifices through at least one upstream portion of the external wall; and
  at least one internal wall forming at least one resonance cavity between the external wall and the at least one internal wall,
  wherein the at least one resonance cavity and the plurality of orifices form at least one Helmholtz resonator, and
  wherein the at least one internal wall comprises at least one textile sleeve configured such that a pressure difference across the at least one textile sleeve supports a sleeve curve profile.

13. A central body disposed within an outer casing of a turbojet gas exhaust nozzle, defining a gas exhaust channel therebetween, comprising:
an external wall including a plurality of orifices through at least one upstream portion of the external wall; and
at least one internal wall forming at least one resonance cavity between the external wall and the at least one internal wall,
wherein the at least one cavity and the plurality of orifices compose at least one Helmholtz resonator,
wherein the at least one internal wall comprises at least one textile sleeve,
wherein the at least one textile sleeve comprises at least one annular attachment zone secured to the external wall by at least one strapping fastened to the external wall, and
wherein at least one annular middle portion of the at least one textile sleeve is free of strapping.

14. The central body as claimed in claim 13, wherein the at least one textile sleeve includes a plurality of sleeves forming a plurality of resonance cavities, and
wherein the plurality of orifices and plurality of resonance cavities compose a plurality of Helmholtz resonators.

15. The central body as claimed in claim 13, wherein the at least one textile sleeve consists of one textile sleeve,
wherein the at least one annular attachment zone consists of two annular attachment zones secured to the external wall by two strappings fastened to the external wall, forming a single resonance cavity therebetween, and
wherein the single resonance cavity and the plurality of orifices compose a single Helmholtz resonator.

16. The central body as claimed in claim 13, wherein the at least one textile sleeve consists of one textile sleeve, and
wherein the at least one annular attachment zone consists of three annular attachment zones secured to the external wall by at least three strappings fastened to the external wall, forming a plurality of resonance cavities therebetween, and
wherein the plurality of resonance cavities and the plurality of orifices compose a plurality of Helmholtz resonators.

17. The central body as claimed in claim 13, wherein the at least one textile sleeve defines at least one internal cavity in fluid communication with a vapor relief stream, for a turbojet comprising a deaerator.

18. The central body as claimed in claim 13, wherein the at least one textile sleeve is formed of a textile of ceramic fibers, a textile of metallic fibers, or combinations thereof.

19. The central body as claimed in claim 13, wherein the at least one textile sleeve is formed of a textile of silica-based fibers.

20. The central body as claimed in claim 13, wherein the at least one textile sleeve is formed of a textile of basalt-based fibers.

21. The central body as claimed in claim 13, wherein the at least one textile sleeve is formed of a textile of metal-based fibers.

* * * * *